March 3, 1970   E. S. McVEY ET AL   3,499,169
VARIABLE FREQUENCY AC REGULATOR
Filed Feb. 14, 1967   2 Sheets-Sheet 1
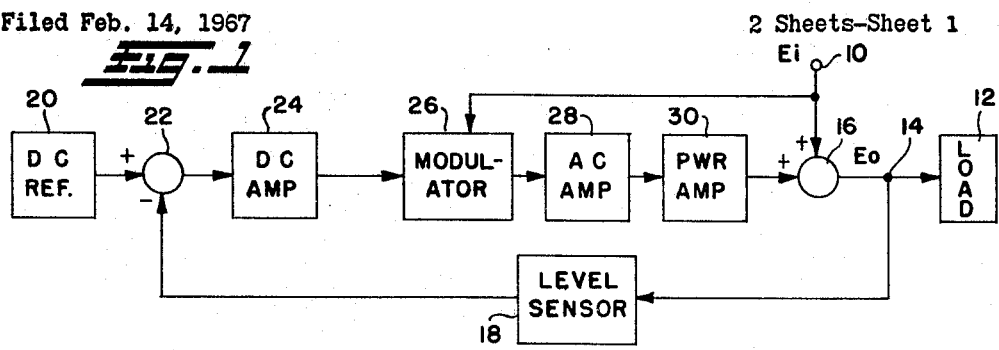
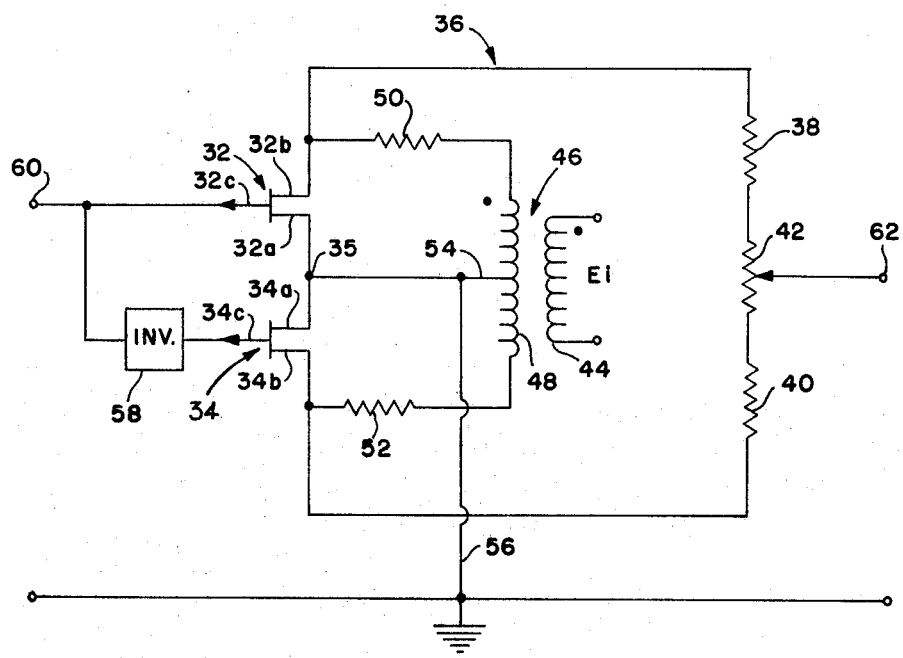
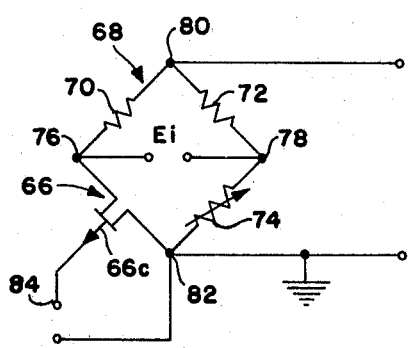
INVENTORS
EUGENE S. McVEY
RAMON E. WARREN, III
BY *Oberlin, Maky & Donnelly*
ATTORNEYS

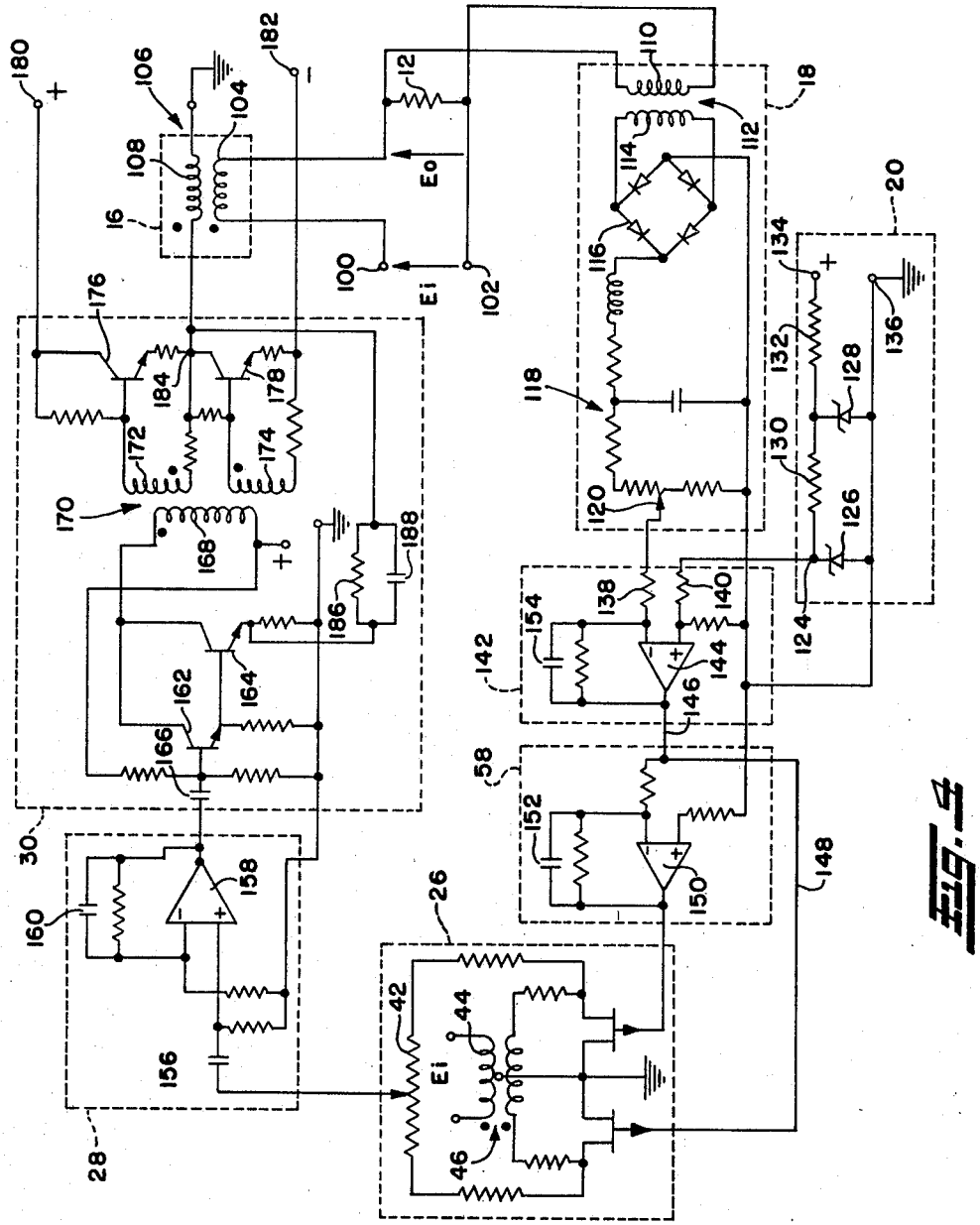

United States Patent Office 3,499,169
Patented Mar. 3, 1970

3,499,169
VARIABLE FREQUENCY AC REGULATOR
Eugene S. McVey, Charlottesville, and Ramon E. Warren III, Bon Air, Va., assignors to Basic Incorporated, Cleveland, Ohio, a corporation of Ohio
Filed Feb. 14, 1967, Ser. No. 615,946
Int. Cl. H02p 13/06, 13/10; H02m 5/12
U.S. Cl. 323—45
4 Claims

ABSTRACT OF THE DISCLOSURE

An AC voltage regulator of solid state components, characterized by a suppressed carrier modulator stage employing a pair of field effect transistors in a bridge circuit arrangement to eliminate feedthrough components in the output voltage and make variable frequency performance possible. Transformer coupled buck-boost of line voltage is employed, the compensating voltage being received, via power amplification, from the modulator stage which is energized in turn by line voltage and a DC error voltage generated from a comparison of a DC analog of output voltage with a DC reference voltage. An alternative form for the modulator stage consists of a single field effect transistor connected in bridge circuit with resistance elements, requiring only a single-ended error voltage input.

---

The regulation of line voltage has received much attention in the prior art and devices performing such function find application wherever load or line variations affect the voltage delivered to any utilization device. the use of regulators has become commonplace in the art, such regulators comprising a closed loop control system where the output voltage is compared with a standard source to maintain the output at a constant level. Much of this art is concerned only with the effective value of the output; however, in light of recent advances in electrical systems it has become more critical that not only the voltage level but also the wave form be controlled to produce as pure a signal as possible compatible with minimal requirements for regulation. In the past circuits have been developed which can meet these requirements at any particular frequency of operation. Few circuits are known which can provide such regulation with a critical control of wave form over a wide range of frequencies. One of these is shown in U.S. Patent 3,241,049 issued on Mar. 15, 1966, to E. S. McVey. The instant invention is an improvement over this circuit.

It is an object of this invention to provide an improved voltage regulator circuit which is operable over a wide range of frequency of line voltage.

It is another object of this invention to provide a variable frequency voltage regulator which maintains a relatively pure signal at the output thereof.

It is a further object of this invention to provide a variable frequency voltage regulator which utilizes a novel modulator circuit having solid state components and of a configuration which prevents feedthrough of the modulating signal to the output, thereby minimizing the occurrence of transient voltages and the like in the output signal.

It is a still further object of this invention to provide such an improved regulator which has superior regulation due to the absence of feedthrough components and made possible by an increase of the loop gain without introducing instability problems.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In said annexed drawings:

FIG. 1 is a block diagram of the improved voltage regulator system showing the utilization of a modulator in a closed loop regulator.

FIG. 2 is a schematic diagram of the preferred embodiment of the modulator portion of this invention.

FIG. 3 is a schematic diagram of a second embodiment of the modulator portion of this invention.

FIG. 4 is a schematic diagram of the complete regulator system including the modulator of FIG. 2.

Referring now to FIG. 1 showing a block diagram of the regulator circuit of the invention, alternating current input voltage $E_i$ is applied at terminal 10 to the circuit for application to a utilization load device 12 connected to the output terminal 14 of the circuit. It is desired to regulate the output voltage $E_o$ at terminal 14 at a constant amplitude and maintain a relatively pure signal over a wide range of input frequency variations as well as for transient variations of the input voltages and of the load 12. The input voltage $E_i$ is applied to a summing section 16 of the circuit which subtracts from or adds to the incoming line voltage $E_i$ a developed control voltage which is of a variable magnitude and precisely in phase and/or out of phase with the input voltage $E_i$ to maintain the output voltage $E_o$ at a constant level. The summing section 16 is detailed hereinafter and it may take any one of many different forms well known in the art, several examples of which are given in the earlier cited patent. Most commonly such summing sections may consist of a transformer having a buck boost type winding wherein the control signal is applied to the primary of the transformer and the secondary affects the line voltage to cause modifications in the amplitude of the output voltage. The requirements of such summing section 16, since it is in the forward loop of the control system, is that it combines the input and developed voltages without introducing signal distortion or time delays which might affect the gain of the system and that it is of sufficient bandwith for all signals utilized in the control system.

The feedback portion of the regulator circuit consists of a level sensor 18 connected to the output terminal 14 of the regulator to provide a feedback signal for utilization in the control system which is directly proportional to the average value of the output voltage $E_o$. In this embodiment of the circuit the level sensor 18 comprises a rectifier of common configuration coupled to the output terminal 14 and an LC filter device for converting the rectified AC signal to a DC level. The average value of the output voltage $E_o$ is recognized by the LC type filter and used as the feedback signal in the circuit. Even though the R.M.S. value is desirable since it is indicative of the power dissipated in the load 12, the average value is readily obtained by rectification and filtering and is easily related to the R.M.S. or effective value and the amplitude of a sinusoidal signal having a relatively pure waveform. The feedback signal is compared with a DC reference signal 20 in a summing circuit 22 to provide the error signal for the regulator system. The use of DC as a reference signal obviates the necessity for maintaining specified phase relationships within the system as the DC is instantaneously available at the desired amplitude and does not limit the frequency response of the system. Similarly, the DC reference is advantageous for variable frequency systems since all output frequencies are converted to a DC level for combination to generate the error signal. The DC reference signal 20 is provided in any convenient manner and may be a fixed level voltage source or may be variable over a small range to provide a means for controlling the level of the output voltage $E_o$ of the regulator. Thus the error signal is an indication of the difference of the average value of the output voltage $E_o$ from a desired voltage which difference may be caused by variations in loading or by line variations of the input voltage $E_i$. Because of the quality of the output voltage $E_o$ of this system, the error voltage is also directly related to the difference in amplitude of the output voltage $E_o$ from a desired voltage, such quality being characteristic of this regulator system as will be brought out in more detail hereinafter.

The error signal is then converted in a suitable DC amplifier 24, a modulator 26, and AC 28 and power 30 amplifiers to provide the correction signal to be combined with the input voltage $E_i$ in the summing section 16 for maintaining the output voltage $E_o$ at a constant value. The modulator 26 is used to convert the DC error signal to an AC voltage which is compatible with the input voltage $E_i$, being in phase with the input voltage $E_i$ so that when summation of the voltages occurs, discontinuities of the waveshape will not be generated.

The modulator 26 is the key element of this system and it is the particular design of the modulator shown in this embodiment which makes variable frequency operation and the enhanced characteristics of this system possible. The amplitude of the output of the modulator 26 must be a linear function of the magnitude of the error signal and with a phase dependent on the polarity of the error signal. The input voltage $E_i$ applied to the regulator system is also the carrier signal for the modulator and provides a convenient means for assuring that the correction signal is either in phase or 180° out of phase with the input voltage so as not to destroy the character of the sinusoidal waveshape of the voltage. The amplified DC error signal from DC amplifier 24 is the modulating signal and it is the polarity of this signal which determines the output phase of the modulator 24 while the amplitude of the error signal determines the amplitude of the AC output from the modulator 24. It is readily seen that under transient conditions, changes of the output voltage $E_o$ will be reflected in the error signal and cause the DC signal applied to the modulator 24 to show a corresponding transient change. It is necessary, therefore, that feedthrough components of the modulating signal not appear in the output of the modulator 26 and thus in the output of the regulator since such transients will occur in the feedback loop to cause instability of the regulator system. Stabilization of a system containing a modulator with appreciable feedthrough is virtually impossible for a very high gain system because the time constants due to RC coupling and transformers of the AC sections of the system appear directly in the transfer function of the unwanted loop. These time constants enter into the carrier loop transfer function in an entirely different manner.

Referring now to FIG. 2, there is shown a first embodiment of a modulator utilized in the regulator system of the invention. A pair of field effect transistors 32, 34 are connected at junction 35 to provide two active legs for a bridge type circuit 36. The field effect transistors 32, 34 are commercially available devices which exhibit a voltage controlled resistive characteristic between their source 32a, 34a, and drain 32b, 34b terminals as a function of the voltage applied to the gates 32c, 34c thereof. The field effect transistors 32, 34 exhibit a bi-directional characteristic at small signal levels and this feature together with the voltage controlled resistive properties of the devices are especially useful for the modulator 26 of this system. The bridge circuit 36 is completed by two fixed resistances 38, 40 and a potentiometer 42 connected in series to the drain terminals 32b, 34b of the transistors.

The bridge 36 is energized by input voltage $E_i$ supplied to the primary winding 44 of the carrier input transformer 46. The secondary winding 48 of this transformer is connected through fixed resistances 50, 52 to the drain terminals 32b, 34b of the transistors. The center tap 54 of the secondary winding 48 is connected to the source terminals 32a, 34a of the transistors and also to ground by way of lead 56. The amplified DC error signal is applied directly to the gate 32c of transistor 32 and through an inverter circuit 58 to the gate 34c of transistor 34.

The following description should suffice to explain the operation of the modulator 26 of this circuit. With input voltage $E_i$ applied as the carrier signal to transformer 46 and with the amplified error voltage or modulating signal applied at terminal 60 at a zero value the potentiometer 42 may be varied until the output voltage at terminal 62 is zero. This potentiometer 42 may be eliminated if matched pairs of transistors 32, 34 have been pre-selected. Initially, it will be assumed that the resistance of each of the transistors 32, 34 is the same and that the potentimeter 42 is set to its midpoint. Thus a carrier signal supplied through the transformer 46 will appear equally in out of phase relationship in the opposite legs of the bridge 36, i.e., across transistors 32, 34 and resistors 38, 40 to provide zero output signal. When the error signal becomes greater than zero, one of the transistors will tend to increase in resistance while because of the inverter circuit 58 the second transistor will be biased in the opposite polarity to cause its resistance to decrease tending to short that leg of the bridge 36. Thus as transistor 32 is biased in the forward direction to cause its resistance between source 32a and drain 32b to tend toward zero, transistor 34 will be reverse biased causing its resistance to increase. The voltage appearing on one half of the secondary 48 of the transformer 46 from an outer lead to the center tap 54 will be applied across transistor 34 and be summed in resistors 38, 40 to cause a voltage of a particular phase to appear at the output terminal 62 of the modulator 26. The voltage appearing between the center tap 54 and the other outer lead of the secondary 48 of the transformer 46 will be effectively shunted in transistor 32 so as not to appear at the output terminal 62 of the bridge. Thus it is seen that the output of the modulator 26 at terminal 62 may vary from a maximum voltage of one phase when the error signal is a maximum of a particular polarity, through a null voltage when the error is zero, to a maximum voltage displaced in phase by 180° when the error signal is a maximum of the opposite polarity.

The voltage output across each of the transistors 32, 34 in FIG. 2 is an amplitude modulated waveform. The output of transistor 32 can be expressed as follows, it being understood that the letter "$w$" corresponds to the Greek letter omega, commonly used to signify angular frequency:

$$e_1 = (E_{c\ max} + KE_{m\ max} \cos w_m t) \cos w_c t \quad (1)$$

or $$e_1 = E_{c\ max}(1 + m_a \cos w_m t) \cos w_c t \quad (2)$$

where $$ma = \frac{KE_{m\ max}}{E_{c\ max}} \quad (3)$$

is defined as the modulation index and the subscripts $c$ and $m$ refer to carrier and modulating signals respectively.

The output voltage of transistor 34 is of the same form but opposite in phase because of the carrier signal and the modulating signal which are both out of phase with respect to transistor 32. The output of transistor 34 can be expressed as $$e_2 = -E_{c\ max}(1 - m_a \cos w_m t) \cos w_c t \quad (4)$$

The output of the transistors 32, 34 is summed in resistors 38 and 40 to obtain the output of the modulator $$e_1 + e_2 = 2E_{c\ max} m_a \cos w_m t \cos w_c t \quad (5)$$

and it follows that $$e_1+e_2 = E_{c\,max}m_a \cos(w_c - w_m)t$$
$$+ E_{c\,max}m_a \cos(w_c + w_m)t \quad (6)$$

According to Equation 6 the output of the modulator contains only the desired upper and lower sidebands with the carrier suppressed.

Referring now to FIG. 3 there is shown a second embodiment of the modulator 26 which may be substituted for the circuit of the moduator 26 shown in FIG. 2. This design of the modulator 26 uses only a single field effect transistor 66 connected in a bridge circuit 68 to provide the requisite amplitude modulated signal and provide a rejection of modulating signal feedthrough. Here a field effect transistor 66 is connected as one leg of a bridge 68 while two fixed resistances 70, 72 and one variable resistance 74 comprise the other three legs of the bridge 68. Input voltage $E_i$ as the carrier signal is applied across opposite terminals 76, 78 of the bridge while the output of the modulator is obtained from the remaining two terminals 80, 82. The amplified DC error modulating signal from amplifier 24 is applied at terminal 84 directly to the gate 66c of the transistor 66 and varies the resistance characteristic of the transistor 66 in accordance with the applied voltage. Under initial conditions with no modulating signal applied the variable resistor 74 is adjusted to balance the bridge 66 and to provide zero output from the modulator 26.

As the modulating signal at terminal 84 varies from positive to negative values, a phase reversal of the output signal at terminal 80 occurs as is well understood in the operation of a bridge circuit. This circuit is advantageous in using only one transistor 66 and in eliminating the necessity for the inverter stage 58 of FIG. 2. However, the gain is reduced to approximately one half of that of the preferred embodiment in providing an amplitude modulated output signal having a phase reversal capacity with no feedthrough of the modulating signal.

Referring now to FIG. 4 there is shown the schematic diagram of the complete regulator system using the preferred embodiment of the modulator 26 in the system. Although many variations are possible in this system including the addition of compensation networks and the like to extend or limit the frequency response of the system, this is one preferred embodiment showing how the unique characteristics of the modulator 26 enhance the performance of the regulator system.

Even though this circuit of FIG. 4 is optimized specifically for 60 Hz. regulation, it is operable as shown over the range of commonly encountered frequencies of from 50 to 1000 Hz. The range may be extended even further or the system may be designed for use at any other particular line frequency by the utilization of techniques familiar to those skilled in this art, since the modulator 26 of the circuit is capable of operation over a wide range of frequencies. 60 Hz. is selected herein for description purposes since it is the most commonly encountered line frequency which is used in conjunction with the regulator.

Input line voltage $E_i$ is applied at terminals 100, 102 and is transferred to a load device 12 through the secondary winding 104 of a transformer 106 which is connected in buck boost relation to the line voltage $E_i$. The regulator circuit provides developed control signals to the primary 108 of the transformer 106 so that voltage may be added or subtracted to the input line voltage $E_i$ to maintain the output voltage $E_o$ across the load 12 at a constant value. Connected across the load 12 is the primary 110 of a transformer 112 comprising a portion of the level sensing circuit 18. Output voltage $E_o$ occurs in the primary 110 of the transformer 112 and is coupled to the secondary winding 114 and rectified in a bridge rectifier 116 connected across the secondary winding 114. An LC filter 118 is connected across the output terminals of the bridge rectifier 116 to provide a DC level at the slider 120 of potentiometer 122 which corresponds in amplitude to the output voltage $E_o$ applied to the load 12. The LC filter 118 senses the average value of the output voltage $E_o$, however, as pointed out previously, this value may readily be related to the RMS or effective value of the voltage.

The DC reference voltage is obtained at terminal 124 from a circuit comprising Zener diodes 126, 128 and voltage dropping resistors 130, 132 to which is applied a DC voltage source at terminals 134, 136 which may be provided in any convenient manner. The output of DC reference circuit 20 is obtained from across diode 126 and is maintained at an accurate level which is dependent upon the regulating characteristics of diode 126.

The DC reference voltage and the sensed DC level are applied through resistors 138, 140 to the summer 22 and DC voltage amplifier 24 shown in FIG. 4 in dashed lines as stage 142. This stage 142 comprises a conventional operational amplifier 114 and since the input voltages from resistors 138, 140 are connected in a differential manner, the output of the stage 142 provides the difference between the voltages in an amplified form or an amplified error signal on line 146. This signal is then delivered to one input of the modulator 26 via line 148 and simultaneously is delivered to the inverter stage 58 and then to the second input of the modulator 26. The inverter stage 58 also consists of an operational amplifier 150 connected so as to provide the necessary inversion while not producing any amplification of the signal. Capacitors 152, 154 are provided in both the inverter 58 and summer and DC voltage amplifier stages 142 to prevent the introduction of spurious signals while not affecting the circuits in the desired range of frequencies.

The voltages thus applied to the modulator 26 comprise the modulating signal and are directly proportional to the error between the instantaneous output voltage $E_o$ and some predetermined value. The same input voltage $E_i$ is applied to the primary 44 of a transformer 46 to provide the carrier signal for the modulator 26 as has been described previously. The output of the modulator 26 from potentiometer 42 is coupled to the voltage amplifier stage 28 by way of capacitor 156. The output of the modulator 26 is an AC signal and is amplified in the voltage amplifier stage 28 to an increased level for application to the power amplifier 30 of the circuit. The voltage amplifier 28 again is an operational type amplifier 158 and includes capacitor 160 for spurious signal suppression.

The drive portion of the power amplifier 30 consists of a pair of transistors 162, 164 connected in the Darlington configuration and receives the signal from the voltage amplifier stage 28 through capacitor 166. The further amplified signal thus appears in the primary 168 of a transformer 170 connected in common to the collectors of each of the transistors 162, 164. Two secondaries 172, 174 are provided for the transformer 170 and are connected in opposite sides of a class B amplifier stage comprising power transistors 176, 178 serially connected between positive and negative DC voltage sources applied at terminals 180, 182 respectively to ground. A common point 184 between each of the transistors 176, 178 is connected to ground through the primary 108 of transformer 106. Currents established through both of the transistors 176, 178 at this stage cause an AC voltage in the primary 108 of the transformer 106 with a phase dependent upon the phase of the voltage received from the modulator 26. It may readily be appreciated that the voltage appearing in the primary 108 of the transformer 106 corresponds both in phase and in amplitude to that of the output of the modulator 26 and is coupled into the secondary 104 of the transformer 106 to add to or subtract from the input voltage $E_i$. A compensation network consisting of a resistor 186 and capacitor 188 is connected from the common point 184 between the transistors 176, 178 to the emitter of transistor 164 to provide a measure of frequency compensation for the circuit.

It is to be appreciated that the regulator circuit is operable over a wide range of frequencies but may be specially designed for optimum use at a particularly frequency and correspondingly compensation networks may be located throughout the circuit. Similarly, it may be also appreciated that the circuit may be optimized for a maximum of speed response to transient changes to maintain the ouput voltage to the load at a constant level. Accordingly, the circuit has been designed for a maximum loop gain and high frequency response while not introducing the problems of instability of the system or even of the various stages of the system. However, these considerations will not be further detailed here since the circuit described is adequate to show those skilled in the art the advantages provided by this invention.

We, therefore, particularly point out and distinctly claim as our invention:

1. A variable frequency voltage regulator comprising an alternating current power source, a load for receiving power from said source, means connected between said source and said load for supplying additive or subtractive power to said load to maintain the voltage applied to said load at a constant value, comprising a reference source of DC voltage, a level sensor connected to said load for sensing the voltage applied to said load and for providing a DC voltage proportional thereto, comparison means connected to said reference source and said level sensor for comparing the voltages of each and for providing a DC error signal having a level proportional to the difference between the voltages and a polarity indicative of the relative magnitudes of the voltages, an active bridge circuit connected to said comparison means and energizable by said alternating current source and the error signal from said comparison means for providing a control voltage having a frequency identical to and synchronized with that of said alternating current source and a phase and amplitude proportional respectively to the polarity and level of the error signal, said bridge circuit comprising at least one field effect transistor in a leg thereof, the error signal being applied directly to the gate electrode of said transistor, and a transformer having a secondary winding conected in series with the alternating current source and the load, the primary winding adapted to be energized by said control voltage from said bridge circuit.

2. A voltage regulator as set forth in claim 1 wherein said bridge circuit comprises a pair of field effect transistors connected as one branch, a pair of resistors connected as the other branch, and means for applying the carrier signal directly across each transistor of said pair of transistors, the control signal being realized as between the junctions of said pair of transistors and said pair of resistors.

3. In an alternating current variable frequency voltage regulator, a modulator for converting an error signal representative of the difference of the output of the regulator from a desired value to an alternating current control signal for summation with line voltage to maintain the output voltage of the regulator at a constant value, comprising a bridge circuit having arms consisting of fixed resistance elements and a pair of field effect transistors, means for applying an alternating voltage as the carrier input to the bridge directly across each of said transistors, and means for applying the error signal as the modulating input to said field effect transistors to form the alternating current control signal at the output thereof.

4. A modulator as set forth in claim 3, wherein the means for applying an alternating voltage to the bridge comprising a transformer having the primary winding energized by line voltage and a center-tapped secondary winding, each half of the secondary winding being connected across source and drain terminals of one of the field-effect transistors.

References Cited

UNITED STATES PATENTS

| 2,810,874 | 10/1957 | Faymoreau | 323—32 X |
| 3,241,049 | 3/1966 | McVey | 323—45 |
| 3,246,176 | 4/1966 | Nazareth | 307—297 |

JOHN F. COUCH, Primary Examiner

A. D. PELLINEN, Assistant Examiner

U.S. Cl. X.R.

307—34; 323—22, 40